United States Patent Office 3,513,887
Patented May 26, 1970

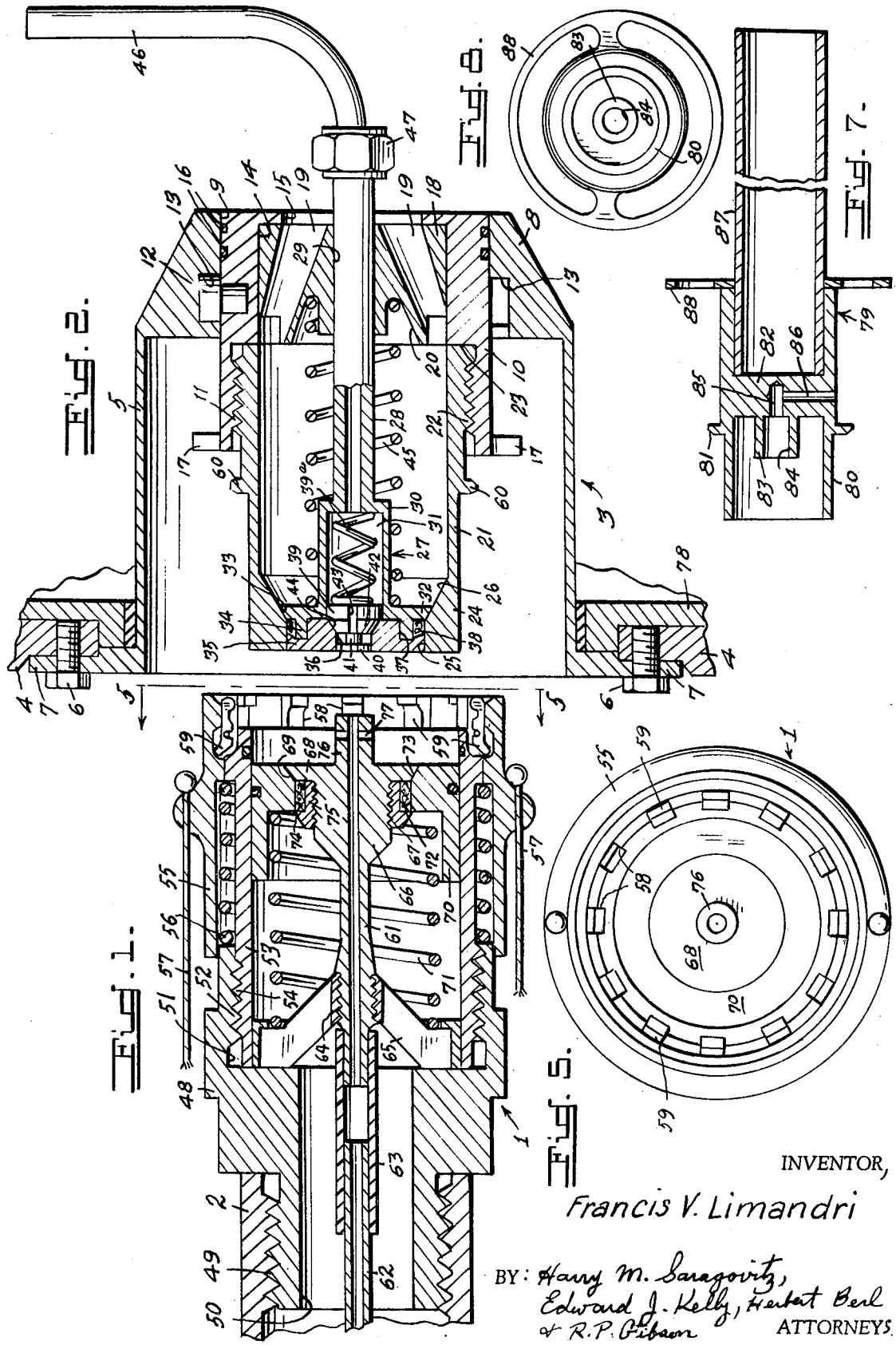

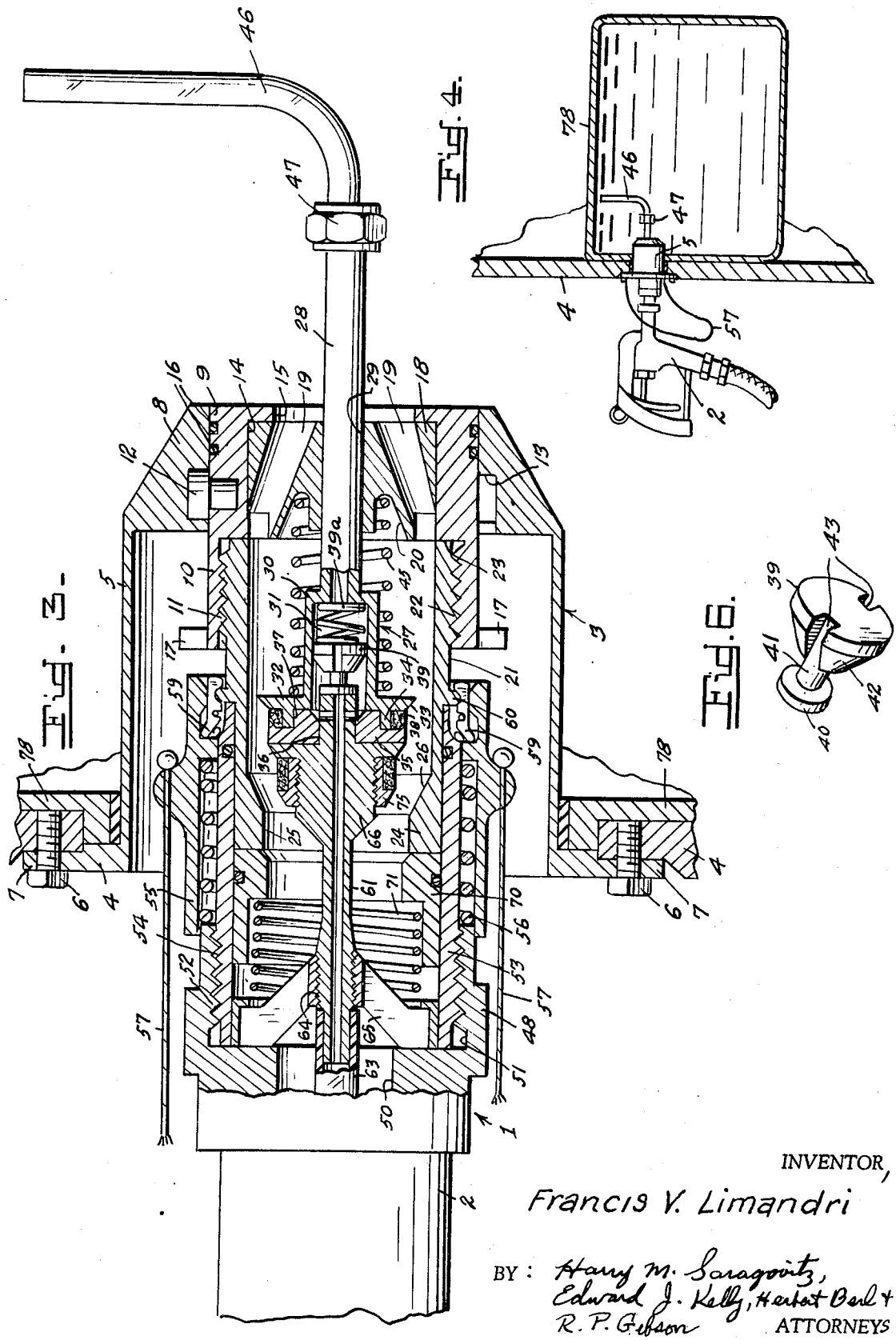

3,513,887
AUTOMATIC SHUT-OFF CLOSED CIRCUIT COUPLING
Francis V. Limandri, Hampton, Va., assignor to the United States of America as represented by the Secretary of the Army
Filed Aug. 24, 1967, Ser. No. 663,177
Int. Cl. B65b 1/30; B67d 5/37
U.S. Cl. 141—207     1 Claim

ABSTRACT OF THE DISCLOSURE

A closed circuit fuel coupling in which fluid connection in established between a fuel dispensing nozzle and an adapter in the filling neck of the fuel tank of a vehicle. When the connection is made, valves in both the dispenser and adapter automatically open to permit free flow of fuel into the tank, while another valve in the adapter automatically opens to complete a vent line from the dispensing nozzle through the adapter and into the tank. When the tank is filled to the desired level, vacuum is destroyed in the vent line causing shut-off of the fuel flow. Separation of the nozzle from the adapter will close all valves.

The invention described herein may be manufactured, used, and licensed by or for the Government for governmental purposes without the payment to me of any royalty thereon.

The present invention, while useful in most vehicles where the fuel tank is filled by gravity, is especially useful for combat vehicles and in particular, helicopters wherein the tank is filled from a three inch neck in its side.

Many disadvantages exist in the present manner of filling fuel tanks, and some of these are as follows:
 (a) The fuel is subject to contamination.
 (b) Vapors created could be ignited by operating engines.
 (c) The tank could not be filled to full capacity.
 (d) Fueling required holding of the filler nozzle by the attendant.
 (e) Vehicle would be unable to make a quick get away.
 (f) Engine would have to be shut off during fueling operation causing more engine starting and drain on the battery.
 (g) Overflowing of fuel tank due to many factors and resultant wastage of fuel.

The present invention is designed to overcome all of the aforesaid disadvantages by providing a coupling which may be quickly attached to a fuel dispensing nozzle in which a vent line ordinarily in the nozzle is continued through an adapter and into the fuel tank wherein it rises to the filling level. The fuel is automatically shut off when the tank is filled and when the coupling and nozzle become separated.

It is therefore an object of this invention to provide a system for fueling a tank in a vehicle whereby a greater amount of fuel may be pumped into the tank than by a gravity method.

Another object is to provide a coupling that is fluid-tight to prevent escape of vapors and possible contamination of the fuel.

A further object is to provide automatic shut off of the fuel when the fuel tank is filled or when the dispenser nozzle is separated from the coupling.

A still further object is to provide a fuel filling coupling that requires no attention once coupled and easily separated in event of sudden departure of the vehicle during the filling operation.

These and other objects and advantages of the present invention will be fully apparent from the following description when taken in connection with the annexed drawings, in which:

FIG. 1 is an axial section of the female member of the coupling and being attached to a fuel dispensing nozzle, a portion of which is shown;

FIG. 2 is a similar view of the male member of the coupling as installed in the wall of a vehicle;

FIG. 3 is an axial sectional view showing the coupling as joined for fuel pumping;

FIG. 4 is a sectional view of a wall and fuel tank of a vehicle and showing a fuel dispensing nozzle coupled with the male member of the coupling;

FIG. 5 is a view looking in the direction of line 5—5 and showing the spring biased dogs as arranged on the locking sleeve;

FIG. 6 is a perspective view of the shut-off valve;

FIG. 7 is a sectional view of an attachment for use with the female member when filling a fuel tank in a conventional manner; and, FIG. 8 is an end view of the attachment shown in FIG. 7.

Referring to the drawings, reference character 1 (FIG. 1) indicates generally the female member of the coupling as attached to a fuel dispensing nozzle 2, only a portion of which is shown since it is a standard item.

MALE MEMBER

The male member of the coupling is generally designated by 3, and in FIG. 1 is shown bolted to the side wall 4 of a vehicle.

Male member 3 consists of a tubular outer housing 5 which is bolted to the side wall 4 of the vehicle, to which it is secured by bolts 6 which pass through an integral flange 7.

Outer housing 5 is provided with a thickened portion 8 at its inner end which is axially bored as at 9.

An adapter socket 10 is fitted into bore 9 and consists of a cup shaped member which is internally threaded as at 11 at its inner end. This adapter socket 10 is retained in portion 8 by locking lugs 12 carried by the inner portion 10 and which ride in a bayonet type slot 13 in the thickened portion 8 of the outer housing 5.

Adapter socket 10 is counterbored as at 14 at its outer end and its outer end is provided with a central bore 15.

O-rings 16 are provided in the outer periphery of socket 10 to seal between it and thickened portion 8.

Ears 17 integral with the inner end of socket 10 provide means for applying a tool such as a wrench, for mounting or dismounting the socket 10 in bore 9.

An end plug 18 is disposed in counterbore 14 and is provided with fuel passageways 19 therethrough and an annular recess 20 at its inner end.

A tubular inner housing 21 having external threads 22 is threaded into internal threads 11 until it abuts shoulder 23 formed by counterbore 19.

Inner housing 21 diverges at its inner end to form a thickened portion 24 which is axially bored as at 25 and the divergence forms a valve seat 26.

A double valve assembly indicated generally by 27 is axially mounted in inner housing 21 and consists of a rigid tube 28 which extends inwardly through an axial bore 29 in plug 18.

Tube 28 is provided with an enlargement 30 which forms a chamber 31 communicating with the passage 32 of tube 28 at its inner end and the enlargement 30 is provided with a flange 32 which is beveled at its periphery as at 33 and forms a valve head registering with valve seat 26 when closed.

The inner face of flange 32 is provided with an annular flange 34.

A valve cap 35, having an axial bore 36 and an annular recess 37, slides in bore 25 and the recess 37 receives the flange 34 therein. A packing 38 is disposed between cap 35 and flange 32.

Valve assembly 27 is further provided with an automatic shut off valve 39 which is biased towards a closed position by a spring 39a.

Valve 39 is provided with a head 40 which slides in bore 36, a reduced stem 41, beveled enlargement 42 and longitudinal grooves 43, best seen in FIG. 6.

Beveled enlargement 42 seats on a valve seat 44 formed in valve cap 35.

The entire valve assembly 27 is biased to a closed position by a spring 45.

Rigid tube 28 sliding in bore 29 is coupled to a flexible tube 46 by a coupling 47.

FEMALE MEMBER

Female member 1 as an adapter for attachment to a fuel nozzle in which only the valve mechanism has been designed to cooperate with the male member 3 of this invention and includes an adapter 48 which is mounted in the forward end of fuel dispensing nozzle 2 by threads 49.

Adapter 48 is provided with an axial bore 50 which is counterbored as at 51 and also is internally threaded as at 52.

A tubular extension 53 is provided at one end with threads 54 and is threadably engaged to threads 52 as shown.

A locking sleeve 55 completes the standard item and is slidably mounted over adapter 48 and extension 53 and is biased by a spring 56. A pull cable 57 is provided for releasing the locking sleeve 55 when in a locked position.

Locking sleeve 55 is notched circumferentially along its outer edge as at 58. Spring biased locking dogs 59 are pivotably mounted in notches 58 and when the male and female members 1 and 3 are mated, dogs 59 slip over a flange 60 on valve housing 21 on the male member 3 as seen in FIG. 3.

As before stated, the valve mechanism in the female member 1 consists of stationary vent tube 61 which is connected to the standard vent tube 62 of nozzle 2 by a plastic tube 63.

Stationary vent tube 61 is threaded as at 64 adjacent its rearward and a spider 65 is threadably mounted thereon for supporting vent tube 61 axially in extension 53.

The forward end of vent tube 61 is thickened as at 66 and is externally threaded as at 67.

Thickened portion 66 is provided with an annular flange 68 which is beveled as at 69 to form a valve seat.

A cup shaped piston valve 70 is slidably mounted in tubular extension 53 and is biased outwardly by a spring 71.

Piston valve 70 is provided at its forward end with a central bore 72 which is beveled at its forward end as at 73 and mates with bevel 69 on flange 68.

A valve packing 74 is provided between bore 72 and a retaining ring 75 which is threadably mounted on threads 67.

Flange 68 is provided with an axial extension 76 which is radially bored as at 77.

In FIG. 4 the coupling is shown as joined for the purpose of filling a fuel tank 78 in a vehicle.

OPERATION

In operation, the coupling of the male and female members 1 and 3 is quickly and easily accomplished and once made, the vent line in both members is continuous as well as the fuel passages since all valves will be opened by the coupling. Breaking of the coupling, of course, closes all the valves which shuts off the fuel flow instantaneously.

As shown installed, in FIG. 4, pipe 46, which is continuous from the dispenser nozzle 2, extends into the fuel tank 76 and up to a point in the tank where the tank can contain the most fuel capacity.

Coupling of the male and female members is shown in FIG. 3 and is accomplished as follows:

The female member 1 is inserted over the male member 3, tubular extension 53 fitting over inner housing 21, also causing locking dogs 59 to slip over flange 60 and lock the members together.

As the tubular extension 53 receives inner housing 21, thickened portion 24 will push piston valve 70 rearwardly and stationary flange 68 will push valve assembly 27 rearwardly. Also shut-off valve 39 is pushed rearwardly in chamber 31, thus establishing full flow of fuel from nozzle 2, through spider 65, into tubular extension 53, through open valve 70, into tubular valve housing 21, passageways 19 and into tank 78.

When the fuel level in tank 78 reaches the top of vent tube 46, fuel will block the vacuum therein causing shut-off valve 39 to close and activates a valve (not shown) in the fuel dispenser to close and shut off flow of fuel.

To break the coupling, cable 57 is jerked to retract sleeve 55 and pull dogs 59 off of flange 60 on housing 21. Upon breaking of the coupling spring 71 will bias piston valve 70 to close and spring 45 will bias valve assembly 27 to close. The system will be airtight both when coupled and broken.

Tube 46 is adjustable, since it may be bent to fit the level of fuel desired in tank 76.

Should the vehicle containing the fuel tank 76 have to take off suddenly, as in the case of a helicopter, the coupling will be broken without harming any of the mechanisms.

In any case, the valves and their mechanisms are operated automatically either upon coupling or break away.

If it is desired to fill the fuel tank of the vehicle in a conventional manner, the tubular housing 21 together with the adapter socket 10 must be removed from the outer housing 5, and a tubular member indicated generally by 79 is inserted (see FIG. 7) into tubular extension 53 of the female member 1.

Tubular member 79 comprises a nipple portion 80 which is somewhat similar to tubular inner housing 21 of male member 3 and is provided with a flange 81 which corresponds to flange 60 of inner housing 21 which slips under locking dogs 59.

A post 82 is disposed diametrically in member 79 (see FIG. 8) and an extension 83 is integral with its inner side and located centrally thereon and provided with a bore 84.

Post 82 is counterbored as at 85 and a radial bore 86 communicates between bore 85 and the exterior of tubular member 79.

A tube 87 fits into the outer end of tubular member 79 as shown.

When tubular member is to be used, it is inserted into tubular extension 53 of the female member 1 and the bore 84 fits over extension 76 of the female member 1. The inner end of tubular nipple portion 80 will open piston valve 70 of the female member 1 and locking dogs 59 slip over flange 81 and the member 79 is held in place.

Now the vent line in stationary tube 61 is completed through bores 85 and 86 and the tube 87 may be inserted into a filling opening of a tank.

The assembly no longer is an automatic shut-off system and nozzle 2 must be manually shut off by the trigger of the nozzle since the vent line of the system now vents to the atmosphere.

To prevent the tubular member 79 from accidently slipping into a fuel tank due to disengagement from the female member, a guard 88 is fitted over tube 87 and abuts nipple portion 80.

Guard 88 will be of a larger diameter than the filling opening of fuel tank.

It is apparent from the foregoing that a fluid coupling has been devised that will enable a fuel tank to be filled with a greater amount of fuel than heretofore and permitting filling of the tank without use of the hands. It is also apparent that this fluid coupling may be used to great advantage in the transfer of other potentially dangerous liquid chemicals.

While only a preferred form of the invention is shown and described, other forms of the invention are contemplated and numerous changes and modifications may be made therein without departing from the spirit of the invention as set forth in the appended claims.

What is claimed is:

1. In a fuel tank having a filling opening in its side wall below its highest filling level, tubular adapter secured in said opening, a male fuel coupling in said adapter for releasable attachment with a female coupling in a fuel hose dispensing nozzle having a stationary vent line and a spring biased piston valve cooperating with a valve seat formed on said stationary vent line therein, said male coupling comprising a tubular housing mounted axially in said adapter, a spring loaded vent tube axially slidable in said tubular housing, its outer end extending into said tank, a coupling connected to said outer end, a flexible tube connected at one of its ends to said last named coupling, its free end adapted to be bent upwards to a desired level of filling above said opening in said tank, the inner end of said vent tube forming a chamber, a first valve integral with the inner end of said chamber normally closing the inner end of said tubular housing, a second valve slidable in said chamber and a spring normaly urging said second valve to close the inner end of said chamber, said first and second valves being opened by said stationary vent line in said female coupling and said piston valve in said female coupling being opened by said tubular housing when said couplings are coupled to provide an airtight connection between said stationary vent line and vent tube, said second valve permitting the flow of liquid to return to the said filling nozzle when fuel in said tank reaches a level to enter the outer end of said flexible tube in said male coupling thereby shutting off fuel supply from said dispenser, both said first and second valves being automatically closed when said coupling is broken.

References Cited
UNITED STATES PATENTS

| | | | |
|---|---|---|---|
| 2,307,427 | 1/1943 | Smith et al. | 141—199 X |
| 3,171,448 | 3/1965 | Fromm | 141—346 X |
| 3,291,152 | 12/1966 | Comer | 141—347 |

HOUSTON S. BELL, Jr., Primary Examiner

U.S. Cl. X.R.

137—614; 141—208, 293, 295, 346